J. Adkins.
Tire Shrinker.
Nº 88,534. Patented Mar. 30, 1869.
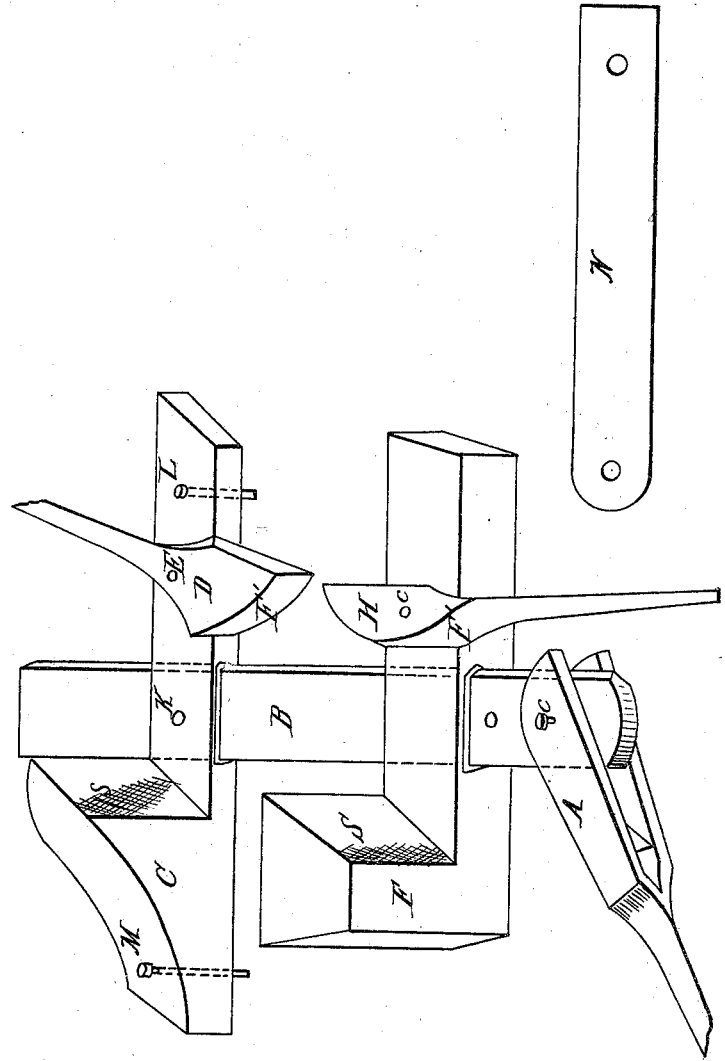
Witnesses
Phil. F. Larney
C. C. Theaker
Inventor:
Joseph Adkins

JOSEPH ADKINS, OF WARRENTON, GEORGIA.

Letters Patent No. 88,534, dated March 30, 1869.

IMPROVEMENT IN TIRE-SHRINKERS.

The Schedule referred to in these Letters Patent and making part of the same.

*To all whom it may concern:*

Be it known that I, JOSEPH ADKINS, of Warrenton, in the county of Warren, and State of Georgia, have invented a new and improved Machine for Shrinking Iron Tires; and I do hereby declare that the following is a full, clear, and exact description of the construction and operation of the same, reference being had to the annexed drawing, making a part of this specification, in which my invention is represented by a perspective view.

The object of this invention is to furnish a cheap, simple, but powerful instrument, by which iron tires, hoops, bands, &c., may be compressed longitudinally, and shrunk in length; and My invention consists in the arrangement of the parts composing my machine, said parts being constructed and arranged as hereinafter described.

In the drawings—

F and C represent two parallel clamps, the latter immovable, the former sliding toward and from the other, upon a tongue, B, which passes through them.

Each clamp is provided with a shoulder, S.

The fixed clamp has two bolts, L M, by means of which it can be attached to a suitable sill, or foundation, so as not to move out of place during the operation of shrinking the tire.

K is a bolt, which fixes this clamp firmly to the tongue B.

In connection with these clamps, I use levers D H, pivoted to the upper surface of the clamps, as shown at E G, and provided with enlarged heads, and corrugated, or roughened faces, F'.

A powerful lever, A, is also pivoted upon the end of the tongue B, by means of a bolt, c.

The faces of all the levers are convex, as seen in the drawing.

The operation of an instrument thus constructed is as follows:

The tire is first heated, for about a foot of its length, and then is laid upon the upper surface of the clamps C F, one of its edges lying against the shoulders S S.

The levers D H are then thrown around till their rough faces F' F' bear against the other edge of the tire, and press it against the walls S S, holding it firmly in place while it is being shortened.

The operation of shortening it is performed by throwing the lever A around to the right, as seen in the drawing, which causes the inclined, or eccentric face of the lever to bear with great power against the tire, compressing it longitudinally at its heated part, and diminishing it in length.

The lever may then be retracted, and an iron wedge inserted, which will fill up the space by which the tire has been shortened, and enable the operator to apply the lever again, and so on till the tire is reduced to its proper length.

Small file-faced pieces of steel or iron may be employed to fill up the space between the edge of the tire and the faces F' F' of levers D and H, when the tire is too narrow to be otherwise operated upon by those levers.

It will be observed that the tongue B is so attached to the fixed clamp that it can be readily removed, and a longer or shorter one substituted, to accommodate tires and bands of various diameters, as will be understood.

This same adaptability may be secured by making the lever A adjustable on the tongue B. I have provided for this, by making several holes, for the bolt c, in the tongue.

I am aware of the patents granted to I. D. Card, dated August 25, 1863, J. W. Lawson, dated June 24, 1862, and A. Rogers, dated August 13, 1867, for tire-shrinking machines, constructed with a fixed and a movable block, an operating-lever, and clamping-devices; therefore I do not claim these features broadly, either separately or combined; but having thus described my invention,

What I claim as new, and desire to secure by Letters Patent, is—

The construction and the arrangement, relative to each other, and to the jaws F and C, of the tongue B and lever A, each being made separate from the other, and from the jaws, and made adjustable relative to each other, and to said jaws, as described.

JOSEPH ADKINS.

Witnesses:
JAMES H. GRIDLEY,
CHAS. A. PETTIT.